G. H. PECK.
SHIPPING CAN.
APPLICATION FILED SEPT. 20, 1909.

968,971.

Patented Aug. 30, 1910.

2 SHEETS—SHEET 1.

Witnesses
E. C. Crocker
S. R. Brattain

Inventor
Giles H. Peck.
By Chandler & Chandler
Attorneys

G. H. PECK.
SHIPPING CAN.
APPLICATION FILED SEPT. 20, 1909.
968,971.
Patented Aug. 30, 1910.
2 SHEETS—SHEET 2.
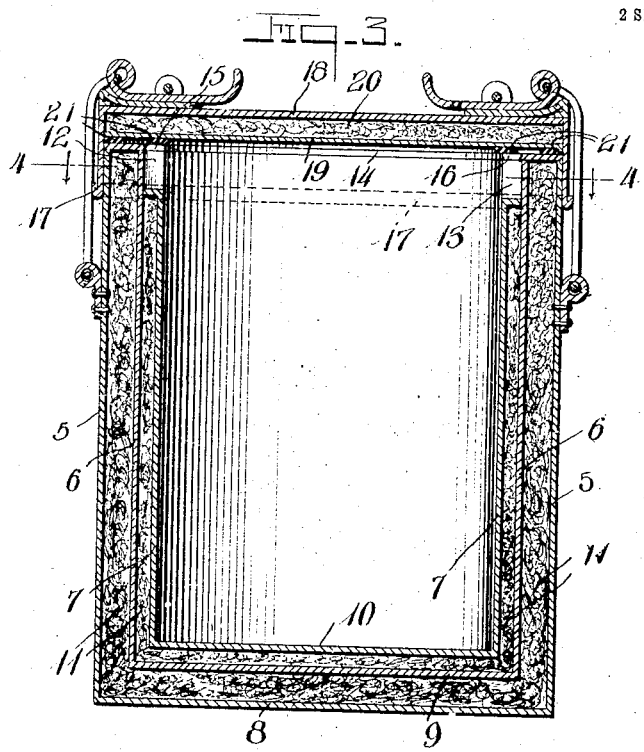
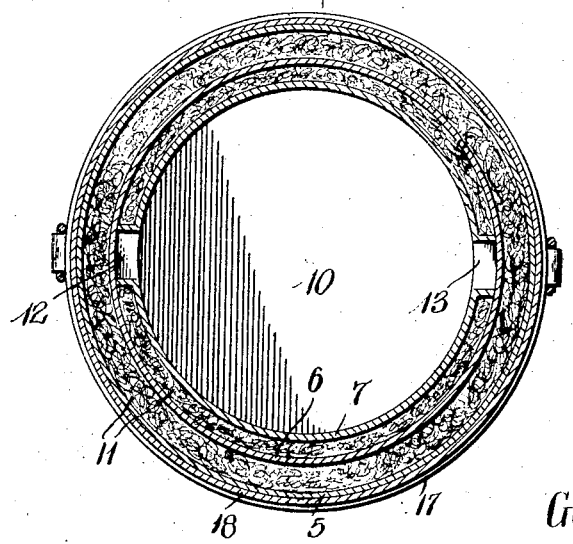
Witnesses
E. O. Crocker
S. R. Ballau
Inventor
Giles H. Peck.
By Chandler & Chandler
Attorneys

UNITED STATES PATENT OFFICE.

GILES H. PECK, OF GRAND ISLAND, NEBRASKA.

SHIPPING-CAN.

968,971.

Specification of Letters Patent. Patented Aug. 30, 1910.

Application filed September 20, 1909. Serial No. 518,518.

*To all whom it may concern:*

Be it known that I, GILES H. PECK, a citizen of the United States, residing at Grand Island, in the county of Hall, State of Nebraska, have invented certain new and useful Improvements in Shipping-Cans; and I do hereby declare the following to be a full, clear, and exact description of the invention, such as will enable others skilled in the art to which it appertains to make and use the same.

This invention relates to shipping cans and particularly to that type which are adapted for shipping ice cream.

The object of the invention is to produce a can for use in shipping ice cream which will have maximum non-conducting properties and thus enable the preservation of ice cream in its frozen state for extremely long periods.

With the above and other objects in view the invention consists in the details of construction and in the arrangement and combination of parts to be hereinafter more fully set forth and particularly claimed.

Figure 1:
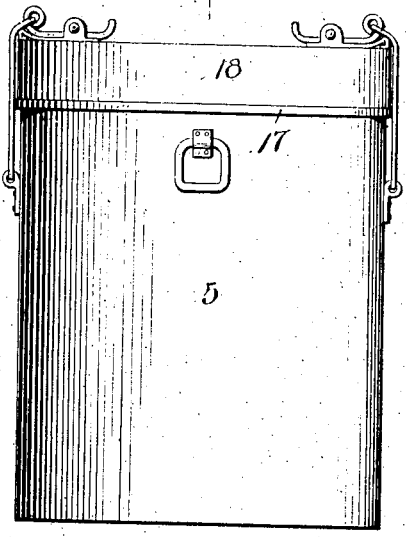
Figure 2:
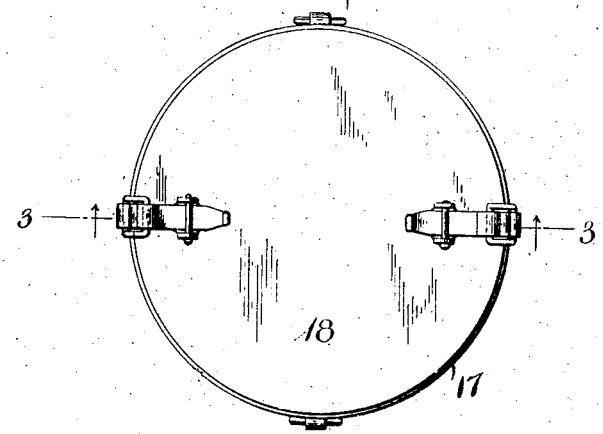

In describing the invention in detail reference will be had to the accompanying drawings in which like characters of reference denote corresponding parts in the several views thereof, and in which, Figure 1 is a front elevation of an ice cream can constructed in accordance with the invention; Fig. 2, a top plan view of the same; Fig. 3, a vertical section on the line 3—3 of Fig. 2; and, Fig. 4, a horizontal section on the line 4—4 of Fig. 3.

Referring to the drawings, the body portion of the can consists of the concentric cylindrical walls 5, 6, and 7 each of which have their lower ends closed by the independent spaced bottoms 8, 9, and 10 respectively. The upper edges of said walls are all secured to a common annular plate 14 through the medium of which entrance to the space between the walls 5, 6 and 7 is closed. Before securing the upper edges of the concentric walls to the annular plate 14 the spaces between the walls 5 and 6; 6 and 7 and the bottoms 8 and 9; 9 and 10, are packed with mineral wool or asbestos 11 which by reason of its non-heat-conducting properties serves to prevent the passage of heat into the interior of the can.

In order to permit the ready removal of the ice cream receptacle when disposed in the interior of the can by tongs, or otherwise, the wall 7 is provided with diametrically opposite recesses 12 and 13, while the annular plate 14 is also provided with corresponding recesses 15 and 16, extending outwardly to the wall 6 and registering at their inner ends with the recesses 12 and 13 respectively. The bottom and sides of the recesses thus formed are then suitably walled to close the resulting openings into the space between the walls 6 and 7.

The top of the can is formed with the usual annular flanged portion 17 adapted to telescope with the wall 5 when the top is applied and a transverse cover portion formed of two circular spaced members 18 and 19 between which is inserted a packing of mineral wool 20. An annular rubber gasket 21 is disposed on the under face of the member 19 and in position so as to be interposed between said member 19 and the annular plate 15 when the top is applied to the body portion of the can.

What is claimed is:—

A shipping can formed of a side wall, bottom and cover, the side wall of said can comprising concentrically disposed outer, inner and intermediate casings separated by an insulated packing, said side wall having diametrically opposite inwardly disposed recesses in its upper end formed by providing the inner casing with oppositely disposed cut-away portions, flanges extending outwardly at the edges of said cut-away portions forming the side and bottom walls of said recesses; the said intermediate casing constituting the outer wall of the recesses.

In testimony whereof, I affix my signature, in presence of two witnesses.

GILES H. PECK.

Witnesses:
LEVI A. CROUCH,
BERTHA LERVOLD.